United States Patent [19]

Gebhardt

[11] Patent Number: 5,544,734
[45] Date of Patent: Aug. 13, 1996

[54] ASSEMBLY CONVEYOR

[75] Inventor: Günter Gebhardt, Sinsheim, Germany

[73] Assignee: Gebhardt Fördertechnick GmbH, Sinsheim, Germany

[21] Appl. No.: 301,287

[22] Filed: Sep. 6, 1994

[30] Foreign Application Priority Data

Sep. 4, 1993 [DE] Germany .............................. 9313348 U

[51] Int. Cl.⁶ .................................................... B65G 47/24
[52] U.S. Cl. ............................................ 198/412; 198/457
[58] Field of Search .................................... 198/457, 412, 198/414, 611, 612, 629

[56] References Cited

U.S. PATENT DOCUMENTS

| | | | |
|---|---|---|---|
| 1,733,409 | 10/1929 | Howe | 198/457 |
| 1,909,481 | 5/1933 | Allen | 198/457 X |
| 3,868,009 | 2/1975 | Billi et al. | 198/412 X |
| 4,256,222 | 3/1981 | Gunti | 198/457 |
| 4,496,110 | 1/1985 | Raasch et al. | 198/457 X |
| 4,759,434 | 7/1988 | Dorner | 198/457 |

*Primary Examiner*—D. Glenn Dayoan
*Attorney, Agent, or Firm*—Anderson Kill Olick & Oshinsky, P.C.

[57] ABSTRACT

An assembly conveyor including two conveyor bands displaceable in opposite directions and defining oppositely arranged assembly work stations, and a substantially transversely displaceable elevation table provided at a discharge end of one of the two conveyor bands for transferring an assembly object from the one of the two conveyor bands to another of the two conveyor bands, with the elevation table including an element for rotating the assembly object during a linear displacement thereof from the one conveyor band to the other conveyor band.

21 Claims, 8 Drawing Sheets

ASSEMBLY CONVEYOR

BACKGROUND OF THE INVENTION

The present invention relates to an assembly conveyor including two conveyor bands displaceable in opposite directions and defining oppositely arranged assembly work stations, and a transverse conveyor which is provided at a discharge end of one of the conveyor bands for transferring assembly objects to another conveyor band.

The assembly conveyor generally includes continuously or cyclically operating transfer devices which transfer an assembly object from one work station to another. However, local conditions, such as space consideration, make it often impossible to arrange the work stations linearly, one after another. In this case, two rows or more of work stations, which extend parallel to each other, are provided.

Independently of whether each separate work station defines a manual assembly position or a fully automatic assembly position, the position of the handled object, the assembly element with respect to the assembly worker or an automatic assembly device should be constant, not changeable.

When the work stations are arranged opposite each other, i.e., arranged along two conveyor bands running in opposite directions, it is not sufficient to transfer the assembly object from one conveyor band to another without rotating it. This is because when transfer is effected without rotating the object, the object would face the worker or the automatic assembly device from a wrong side.

Numerous devices are used for rotating an object upon its transfer to the parallel conveyor band. These devices include lifting and rotating devices which cooperate with the transfer devices. However, to provide for proper cooperation of the transfer and rotating devices, rather expensive constructions have to be used because they require transverse displacement of linearly movable objects for effecting rotation.

German patent 2,259,273 discloses a device for the transfer of units from a roller conveyor. The device comprises at least one traction element, which is displaceable transverse to the roller conveyor and under the unit for sidewise displacement of the unit out of the region of the roller conveyor. The traction element has at least two spaced entrained members arranged one after another, with each being associated with a raised cam strip, which extends along the transfer path for lifting and lowering the transferred unit.

In the above-described case, the unit can be considered as an assembly object which is transferable from one conveyor band to another. However, the transfer device does not provide for rotation of the transferable unit or object.

Accordingly, an object of the present invention is to provide a device for transferring an object from one conveyor band to another conveyor band, which extends parallel to the one conveyor band and runs in an opposite direction, with the object being rotated as it moves along a transfer path, so that the same side of the object, which faces the work stations defined by the one conveyor band or a related side of the object, will face the work stations defined by another conveyor band.

SUMMARY OF THE INVENTION

This and other objects of the invention, which will become apparent hereinafter, are achieved by providing an assembly conveyor comprising a substantially transversely displaceable elevation table provided at a discharge end of one of the two conveyor bands for transferring an assembly object from the one of the two conveyor bands to another of the two conveyor bands, with the elevation table including means for rotating the assembly object during a linear displacement thereof from the one conveyor band to the other conveyor band.

According to a preferred embodiment of the invention, the elevation table has a support plate which is connected with the rotating means by a pivot lever connected with the support table for joint rotation therewith. In this embodiment, the support plate is fixedly supported on a shaft which is fixedly connected with the pivot lever.

The pivot lever has at an end thereof, which is opposite to the end at which it is connected with the support plate shaft, a guide pin which engages a cam provided on a so-called crank plate. The elevation table is also provided with linear guides which provide for linear movement of the assembly object, after it was taken off from a conveyor band, to another conveyor band. As it was noted previously, the rotation of the object is effected during linear movement of the support plate, together with the object, transverse to the longitudinal extent of the two conveyor bands.

The cam formed on the crank plate has a predetermined operational length and extends along the linear travel path of the elevation table from the first conveyor band to the second conveyor band. According to the invention, the cam has a first linear region and a cam curve section which leads to a tip of the cam. The first curve section provides for rotation of the support plate, together with the object positioned thereon, by 90°.

The cam has a second curve section, which leads from the tip region of the cam, and a second linear region which proceeds from the end of the second curve section remote from the cam tip. The second curve section likewise provides for rotation of the support plate, together with the object placed thereon, by another 90°. Thus, the entire cam provides for rotation of the support plate, together with the object thereon, by 180°. To achieve this, the first and second curve sections are formed positive and negative, respectively.

There are also provided linear guides which insure linear displacement of the elevation table along the transverse path from one conveyor band to another conveyor band. The linear displacement of the elevation table is ensured by suitable actuation means, for example, a pneumatic cylinder.

To ensure rotation of the support plate during linear displacement of the elevation table, a proper operational connection should be established between the support plate, the pivot lever and the cam, with the pivot lever defining, at its opposite ends, the axes of the guide pin and the support plate shaft, respectively.

As it has already been previously discussed, the guide pin and the support plate shaft are fixedly connected with the pivot lever for joint rotation therewith, with the distance between the pivot axis and the shaft axis remaining constant. The foregoing arrangement insures a proper proportionality between the rotational movement of the support plate shaft and the displacement of the guide pin along the cam travel path.

The support plate of the elevation table is supported on scissors, which are actuated by cushions for lifting the support plate above the conveyor band. To provide for linear movement, the elevation table includes a slide provided with rockers, which engage rails defining linear guide means. The slide has a head plate, through middle of which the support plate shaft extends. The head plate is further provided with a bearing shell which receives, e.g., a ball bearing which rotatably supports the support plate shaft. The linear movement of the elevation table is insured by special actuation means acting on the slide.

It is to be pointed out that while a 180° rotation of the support table, together with the object, was discussed, the cam can be formed to provide for any other desired angular rotation of the support plate and, thus, of the object.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
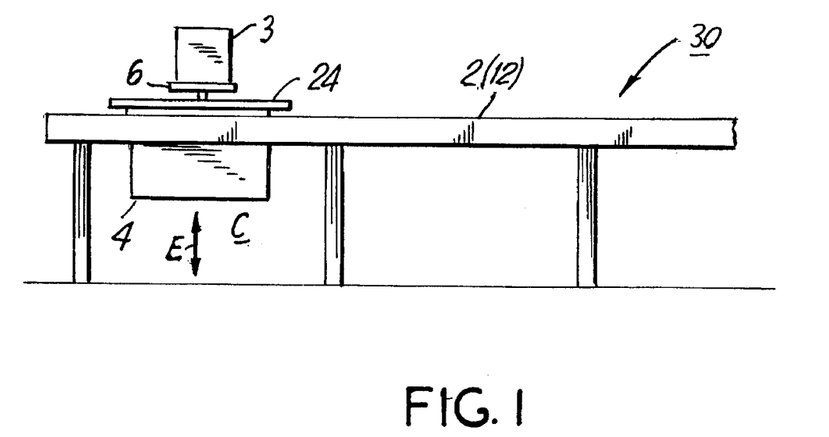
FIG. 1 is a side schematic view of an assembly conveyor according to the present invention.
Figure 2:
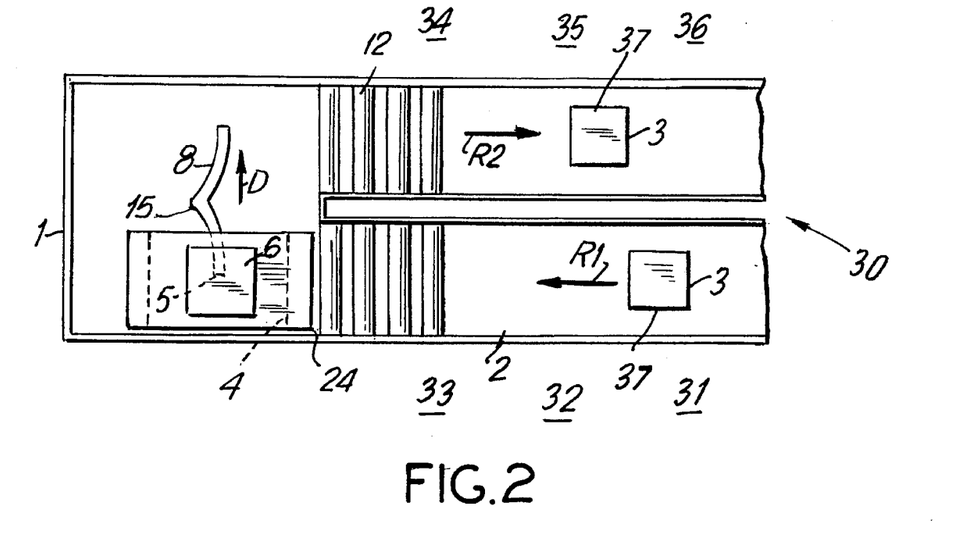
FIG. 2 is a plan schematic view of an assembly conveyor according to the present invention.

An assembly conveyor 30, according to the present invention, is shown schematically in FIGS. 1 and 2. The assembly conveyor 30 is formed from two oppositely displaceable conveyor bands 2 and 12. The assembly bands 2 and 12 may be formed as a roller conveyor, chain conveyor, or the like. The displacement direction of the assembly bands 2 and 12 is shown with arrows $R_1$ and $R_2$, respectively. Along the assembly bands 2 and 12, assembly work stations 31–36 are provided. The work stations 31–36 are arranged opposite to each other, as shown in FIG. 2.

In accordance with the assembly steps to be undertaken, a to-be-assembled object 3 is displaceable along the assembly bands 2 and 12 in the direction of arrows $R_1$ and $R_2$ from work station 31 to work station 36, through intermediate stations 32–35.

Two assembly bands, which are displaceable in opposite directions, are provided when, in view of the limited amount of available space, the work stations 31–36 cannot be arranged one after another. With the assembly conveyor 30, shown in FIGS. 1 and 2, the object 3 need be transferred at an assembly conveyor end 1, from the conveyor band 2 to the oppositely displaceable conveyor band 12.

It is often necessary to insure the access to the same side of the object 3 on both conveyor bands 2 and 12. This means that the object 3 not only need be transferred by a cross conveyor at the conveyor end 1, but also be rotated so that the side 37 of the object 3 faces all of the work stations 31–36 during the displacement of the object 3 on conveyor bands 2 and 12.

According to the invention it is provided that the object 3, after it leaves the first conveyor band 2 at the conveyor end 1, is displaced onto an elevation table 4, which is provided at the conveyor end 1 and is raised in the direction of arrow C.

After the object 3 is taken by the elevation table 4, the table 4 or the slide 24 provided thereon, is displaced in the direction of arrow D to the second conveyor belt 12. The object 3 is supported on the support plate 6 which, upon displacement in the direction of arrow D, is rotated by suitable rotating means 5, which includes a control cam 8, into a desired assembly position of the object 3.

According to the invention, the rotation of the object 3 is effected by 90° until it reaches the region of the cam tip 15. The rotating means 5 provides for further rotation by 90° during further linear displacement of the object 3. Thus, the object 3 is rotated by 180° before it reaches the second conveyor band 12. After the object 3 reaches the second conveyor band 3, the elevation table 4 is pulled-in in the direction of arrow E, with the object 3 being taken up by the second conveyor band 12.

Figure 3:
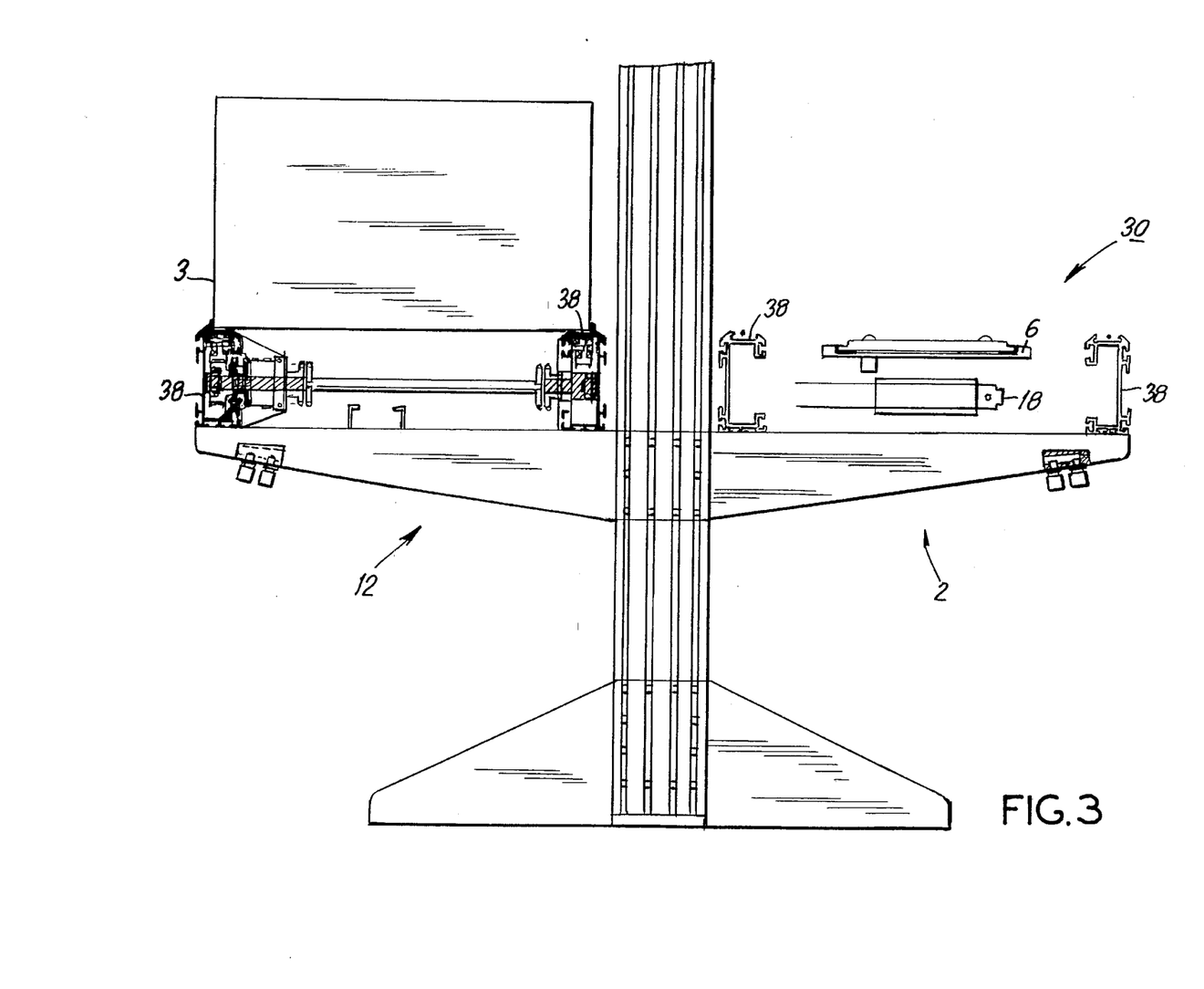
FIG. 3 is a partially cross-sectional view of an assembly conveyor, according to the present invention, shown in FIG. 4 in the direction of arrow A.

The inventive assembly conveyor 30 will now be described in more detail with reference to FIGS. 3 and 4.

As it has already been mentioned, the assembly conveyor 30 is formed as a roller or chain conveyor which, in the longitudinal direction, is limited by parallel metal cheeks 38 located on opposite sides thereof. When the object 3, which is displaceable on the first conveyor band 2 of the conveyor 30 in the direction of the arrow $R_1$, reaches the elevation table 4 provided at the conveyor end 1, the lifting cushion 22 effects upward movement of scissors which support the support plate 6, and the plate 6 together with the object 3 located thereon, is lifted.

Thereafter, the slide 24 is displaced transverse to the direction $R_1, R_2$ by appropriate linearly displaceable means 18, for example, a pneumatic cylinder. For effecting proper displacement of the slide 24, there are provided linear guide means 11 formed of rails 25 and rockers 26.

The slide 24 has a head plate 27 in which a bearing shell 28 is provided, in which a ball bearing 29 for supporting shaft 19 of the support plate is located. Beneath the slide 24, that is between the guides 11, there is located a crank plate 10 with a control cam 8 for transforming the linear movement into a rotational movement.

A guide pin 9 of a pivot lever 7 engages the cam 8. The pivot lever 7 is fixedly connected with the shaft 19 of the support plate 6 for joint rotation therewith. This arrangement provides for rotation of the linearly movable shaft 6, the rotation of which is insured by the pivot lever 7. By selecting an appropriate ratio of the displacement of the shaft 19 to the rotation of the lever 7, it is insured that the shaft 19 and thereby, the support plate 6, is rotated a predetermined amount during its linear displacement, which amount corresponds to the predetermined or desired assembly position of the object 3. In the present scenario, the support plate 6 is rotated by 180°.

Figure 4:
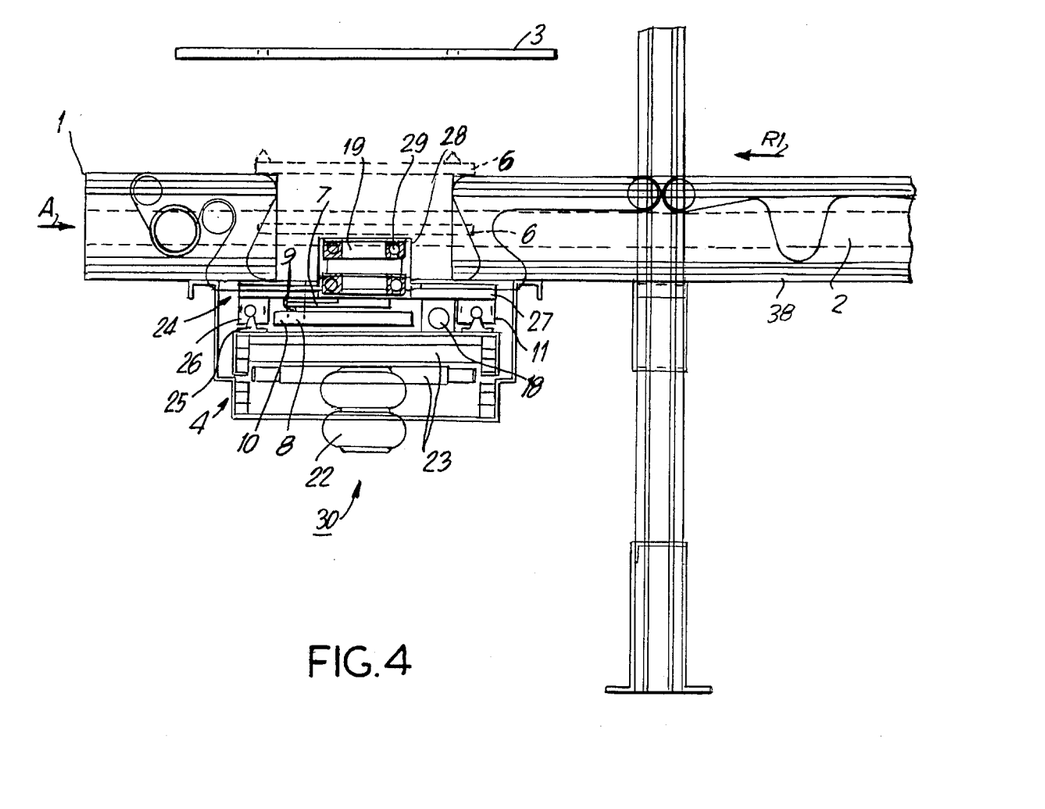
FIG. 4 is a side elevational view of an embodiment of an assembly conveyor according to the present invention.
Figure 5:
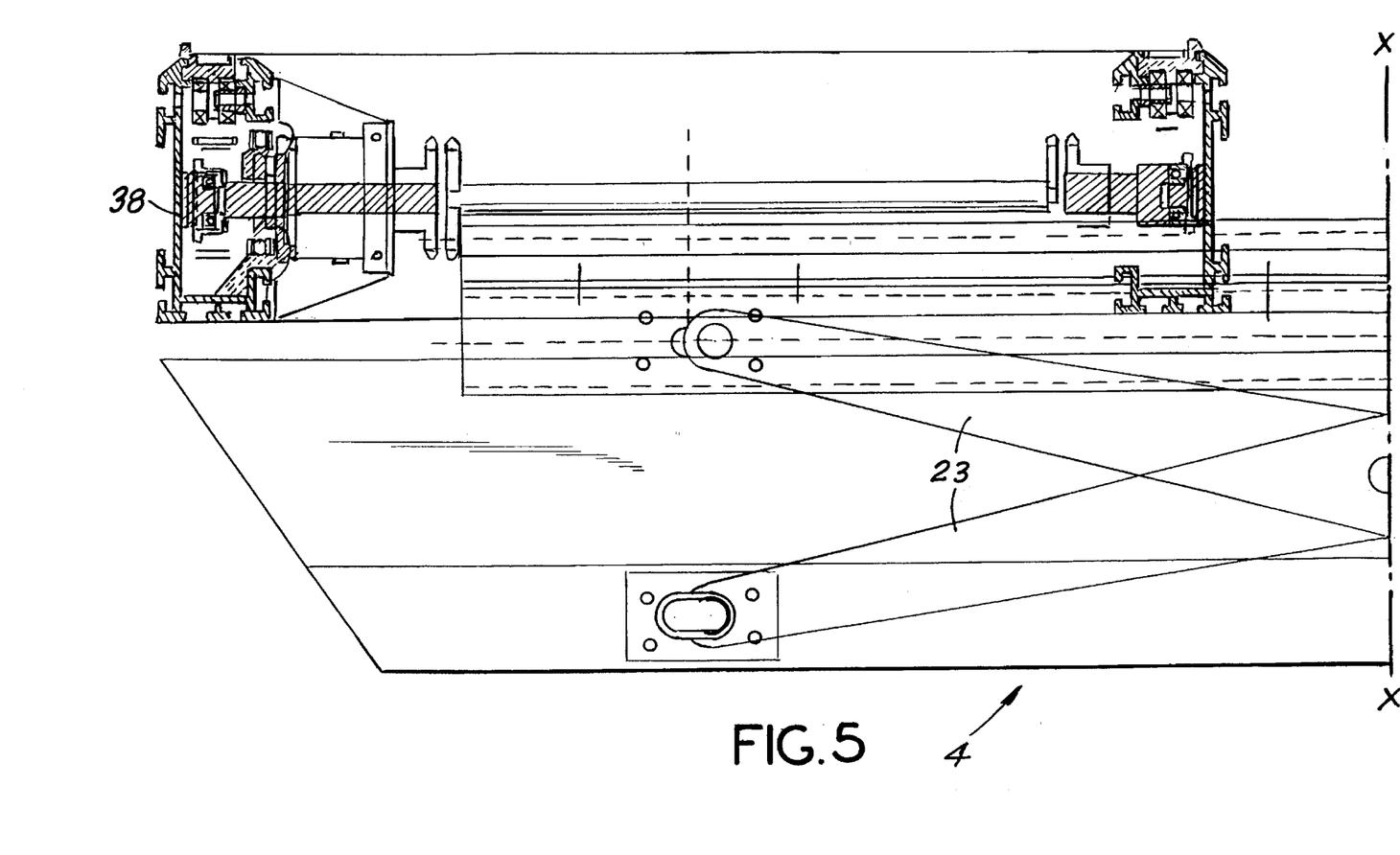
FIGS. 5 & 6 are views similar to that of FIG. 3 and showing, at an increased scale, portions of the assembly conveyor shown in FIG. 3, with an elevation table in an extended condition thereof.
Figure 6:
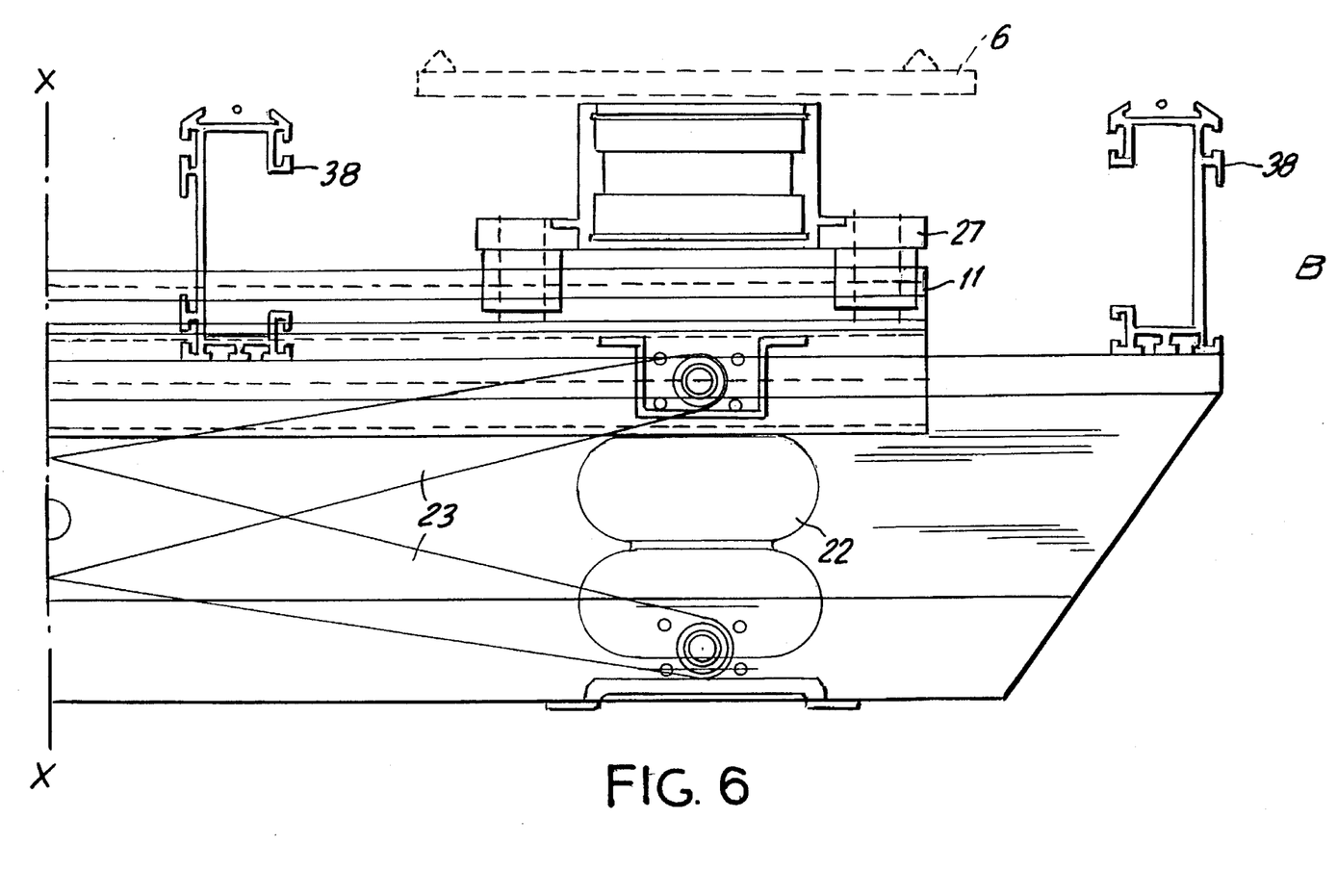
Figure 7:
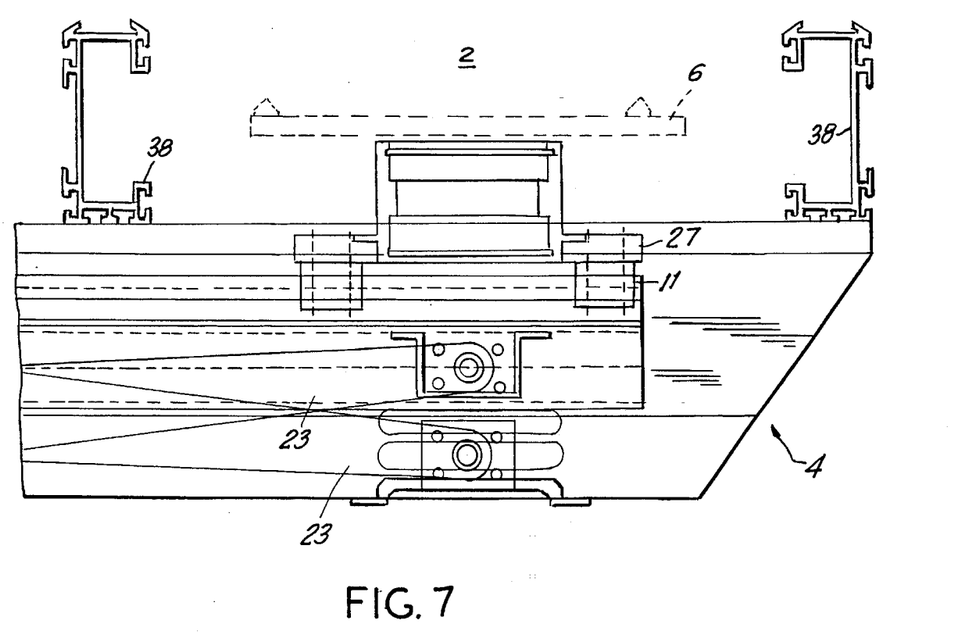
FIG. 7 is a view showing a detail of the assembly conveyor shown in FIG. 6 but with the elevation table in a pulled-in condition thereof.
Figure 8:
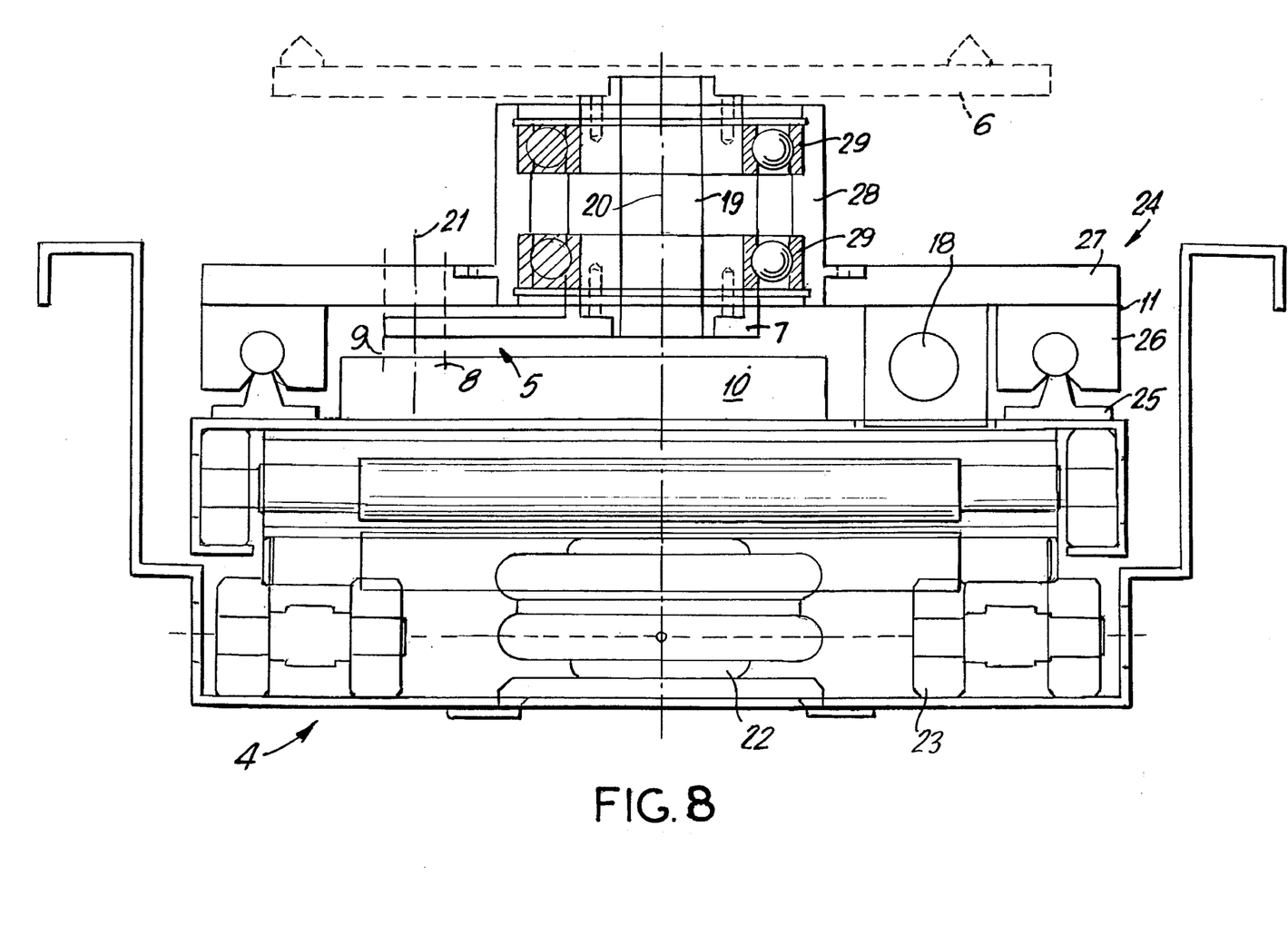
FIG. 8 is a partial cross-sectional view of the elevation table.

FIGS. 5 and 6 as well as FIGS. 7 and 8 show portions of the conveyor 30 shown in FIG. 4 at an increased scale, with FIGS. 5 and 6 being connectable along the line X–Y.

Figure 9:
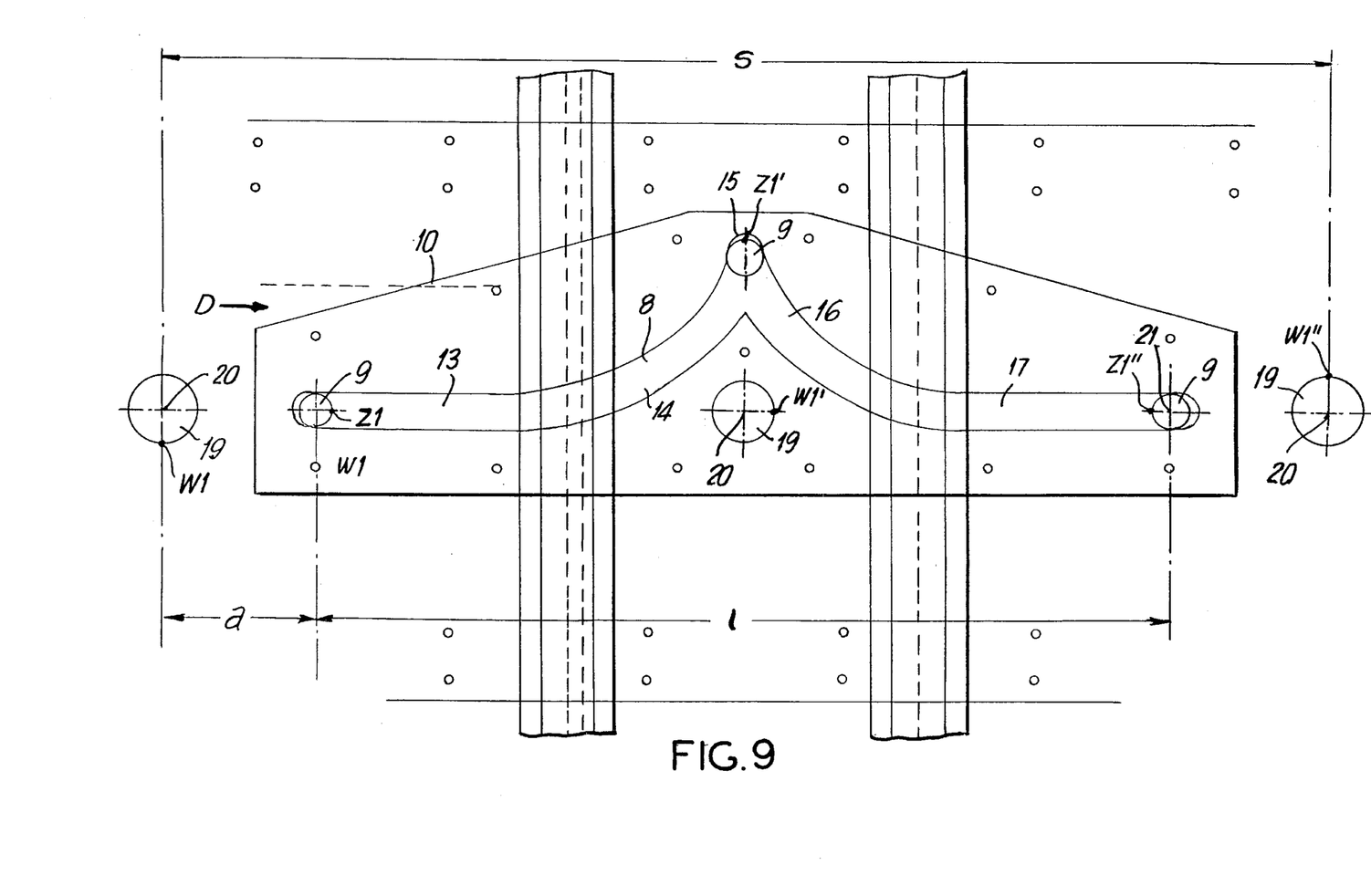
FIG. 9 is a view of a crank plate with a control cam.

FIG. 9 shows a crank plate 10 in which a control cam 8 is formed. The cam 8 is defined by a groove in which the guide pin 9 is engaged. The operational length L of the cam 8 is selected to insure that the support plate 6, together with the object 3 positioned thereon, is rotated into a predetermined assembly position before it reaches the second conveyor band 12, during the linear displacement of the support plate 6 from the conveyor band 2 to the conveyor plate 12.

The cam 9 has two opposite linear regions 13 and 17, defining the start and finish points of the guide pin 9.

The distance a between the axis 21 of the guide pin and the axis 20 of the shaft 19 remains always constant. To clarify the linear displacement-rotational displacement ratio of the guide pin 9 and the shaft 19, orientation points W and Z will be used.

At the start of the movement of the slide 24 in the transverse direction indicated by the arrow D, the lever 7 together with the guide pin 9 and the shaft 19, moves linearly along the first linear region 13. Upon arriving at the first cam curve sector 14, the rotation of the guide pin 9 and the simultaneous rotation of the shaft 19 starts, and the initial orientation points W1 and Z1 of the shaft 19 and the guide pin 9, respectively, occupy positions $W1^1$ and $Z1^1$ when the guide pin 9 arrives at the cam tip 15. With this, the support plate 6 was rotated by 90°, while still moving linearly.

Upon further linear displacement, the guide pin 9 is displaced along the second cam curve sector 16 of the cam 8, with continuing rotation of the shaft 19 and the support plate 6, until the orientation points Z1 and W1 are in positions $W1^{11}$ and $Z1^{11}$. During this displacement the shaft 19 together with the support plate 6 was rotated by another 90°, so that the support plate 6 was rotated altogether by 180°. Thus, according to the present invention, the linear movement of the slide is used for effecting the necessary rotational movement, without providing a separate rotational position on the travel path of the elevation table 4, from the conveyor band 2 to the conveyor band 12.

Though the present invention was shown and described with reference to the preferred embodiment, various modifications thereof will be apparent to those skilled in the art and, therefore, it is not intended that the invention be limited to the disclosed embodiment and/or details thereof, and departures can be made therefrom within the spirit and scope of the appended claims.

What is claimed is:

1. An assembly conveyor, comprising:
    two conveyor bands displaceable in opposite directions and defining oppositely arranged assembly work stations, and
    a substantially transversely displaceable elevation table provided at a discharge end of one of the two conveyor bands for transferring an assembly object from the one of the two conveyor bands to the other of the two conveyor bands, the elevation table including means for rotating the assembly object during a linear displacement thereof from the one conveyor band to the other conveyor band.

2. An assembly conveyor as set forth in claim 1, wherein the elevation table includes a support plate for supporting the assembly object, and the rotating means includes a pivot lever operationally connecting the support plate with the rotating means.

3. An assembly conveyor as set forth in claim 2, wherein the support plate is supported on a shaft.

4. An assembly conveyor as set forth in claim 3, wherein the pivot lever is connected, at one end thereof, with the support plate shaft for joint rotation therewith and has, at another end thereof, a guide pin, and wherein the rotating means includes a crank plate provided with a control cam, the guide pin engaging the control cam during linear displacement of the pivot lever.

5. An assembly conveyor as set forth in claim 1, wherein the elevation table includes linear guide means.

6. An assembly conveyor as set forth in claim 4, wherein the cam has an operational length extending substantially transverse to longitudinal extent of the two conveyor bands and extending along a path of linear displacement of the elevation table.

7. An assembly conveyor as set forth in claim 6, wherein the cam has a first linear region, a first curve section leading to a cam tip region, a second curve section leading from the tip region, and a second linear region proceeding from the second curve section.

8. An assembly conveyor as set forth in claim 7, wherein the first curve section is positive and provides for rotation of the support table together with the assembly object by 90°, and the second curve section is negative and provides for further rotation of the support table, together with the assembly object, by 90°.

9. An assembly conveyor as set forth in claim 4, wherein the cam has an operational length that provides for rotation of the support plate, together with the assembly object, by 180°.

10. An assembly conveyor as set forth in claim 5, wherein the elevation table further includes a support plate for supporting the object, and means for linearly displacing the support plate and the guide means, and wherein the rotating means includes a crank plate with a control cam provided thereon and a pivot lever having a guide pin, which engages the cam, at one end thereof and having another end thereof connected with a shaft supporting the support plate.

11. An assembly conveyor as set forth in claim 10, wherein the support plate shaft has an axis having a linear displacement path.

12. An assembly conveyor as set forth in claim 10, wherein the opposite ends of the pivot lever define axes of the support plate shaft and the guide pin, respectively.

13. An assembly conveyor as set forth in claim 10, wherein the guide pin and the support plate shaft are connected with the support plate for joint rotation therein.

14. An assembly conveyor as set forth in claim 12, wherein a distance between the axes of the guide pin and the support plate shaft is constant.

15. An assembly conveyor as set forth in claim 10, wherein an amount of rotation of the support plate shaft is proportional to the travel path of the guide pin along the cam.

16. An assembly conveyor as set forth in claim 2, wherein the elevation table includes scissors for supporting the support plate, and a lift cushion for actuating the scissors for lifting the support plate.

17. An assembly conveyor as set forth in claim 2, wherein the elevation table further includes a slide for effecting displacement of the elevation table, and linear guide means for guiding the slide and including rail means and rocker means engaging the rail means.

18. An assembly conveyor as set forth in claim 17, wherein the slide has a head plate, and the support plate has a support shaft extending through the head plate approximately in the middle of the head plate.

19. An assembly conveyor as set forth in claim 18, wherein the head plate has a bearing shell arranged therein to provide for rotatable support of the support plate shaft.

20. An assembly conveyor as set forth in claim 19, further comprising a ball bearing arranged within the bearing shell for rotatably supporting the support plate shaft.

21. An assembly conveyor as set forth in claim 2, wherein the elevation table further includes a slide for effecting displacement of the elevation table, and actuation means for linear displacing the slide.

\* \* \* \* \*

UNITED STATES PATENT AND TRADEMARK OFFICE
CERTIFICATE OF CORRECTION

PATENT NO. : 5,544,734
DATED : August 13, 1996
INVENTOR(S) : Gunter Gebhardt

It is certified that error appears in the above-indentified patent and that said Letters Patent is hereby corrected as shown below:

Title page, item [73], Assignee:  should be --Gebhardt Fordertechnik GmbH, Sinsheim, Germany--.

Signed and Sealed this

Nineteenth Day of November, 1996

Attest:

BRUCE LEHMAN

*Attesting Officer*   *Commissioner of Patents and Trademarks*